(12) United States Patent
Azadet et al.

(10) Patent No.: US 9,176,735 B2
(45) Date of Patent: *Nov. 3, 2015

(54) DIGITAL SIGNAL PROCESSOR HAVING INSTRUCTION SET WITH ONE OR MORE NON-LINEAR COMPLEX FUNCTIONS

(75) Inventors: Kameran Azadet, Morganville, NJ (US); Jian-Guo Chen, Basking Ridge, NJ (US); Samer Hijazi, Bethlehem, PA (US); Joseph Williams, Holmdel, NJ (US)

(73) Assignee: Intel Corporation, Santa Clara, CA (US)

(*) Notice: Subject to any disclaimer, the term of this patent is extended or adjusted under 35 U.S.C. 154(b) by 1262 days.

This patent is subject to a terminal disclaimer.

(21) Appl. No.: 12/324,926

(22) Filed: Nov. 28, 2008

(65) Prior Publication Data

US 2010/0138468 A1 Jun. 3, 2010

(51) Int. Cl.
  *G06F 7/483* (2006.01)
  *G06F 9/30* (2006.01)
  *G06F 17/16* (2006.01)

(52) U.S. Cl.
  CPC .................................. *G06F 9/3001* (2013.01)

(58) Field of Classification Search
  None
  See application file for complete search history.

(56) References Cited

U.S. PATENT DOCUMENTS

| | | | |
|---|---|---|---|
| 5,864,689 A * | 1/1999 | Tran | 712/208 |
| 6,529,922 B1 | 3/2003 | Hoge | |
| 6,741,662 B1 * | 5/2004 | Francos et al. | 375/297 |
| 6,844,880 B1 | 1/2005 | Lindholm et al. | |
| 7,461,116 B2 * | 12/2008 | Allen | 708/495 |
| 7,752,419 B1 * | 7/2010 | Plunkett et al. | 712/15 |
| 2003/0041083 A1 * | 2/2003 | Jennings et al. | 708/622 |
| 2003/0154226 A1 * | 8/2003 | Khmelnik | 708/490 |
| 2004/0073588 A1 * | 4/2004 | Jennings, III | 708/517 |
| 2005/0008096 A1 * | 1/2005 | Iwasaki et al. | 375/297 |
| 2005/0065990 A1 * | 3/2005 | Allen | 708/495 |
| 2005/0182811 A1 * | 8/2005 | Jennings et al. | 708/502 |
| 2007/0112902 A1 | 5/2007 | Dance et al. | |

OTHER PUBLICATIONS www.Wikipedia.com, Integrated Circuit, Dec. 2004, pp. 1-6.*
Gilberto E. Urroz, Elementary mathematical functions in MATLAB, Aug. 2004, pp. 1-27.*

* cited by examiner

*Primary Examiner* — Henry Tsai
*Assistant Examiner* — Dean Phan
(74) *Attorney, Agent, or Firm* — Nicholson De Vos Webster & Elliott LLP

(57) ABSTRACT

Methods and apparatus are provided for a digital signal processor having an instruction set with one or more non-linear complex functions. A method is provided for a processor. One or more non-linear complex software instructions are obtained from a program. The non-linear complex software instructions have at least one complex number as an input. One or more non-linear complex functions are applied from a predefined instruction set to the at least one complex number. An output is generated comprised of one complex number or two real numbers. A functional unit can implement the one or more non-linear complex functions. In one embodiment, a vector-based digital signal processor is disclosed that processes a complex vector comprised of a plurality of complex numbers. The processor can process the plurality of complex numbers in parallel.

18 Claims, 1 Drawing Sheet

DIGITAL SIGNAL PROCESSOR HAVING INSTRUCTION SET WITH ONE OR MORE NON-LINEAR COMPLEX FUNCTIONS

CROSS-REFERENCE TO RELATED APPLICATIONS

The present application is related to U.S. patent application Ser. No.12/324,927, entitled "Digital Signal Processor Having Instruction Set with One or More Non-Linear Functions Using Reduced Look-Up Table;" U.S. patent application Ser. No. 12/324,931, entitled "Digital Signal Processor Having Instruction Set with One or More Non-Linear Functions Using Reduced Look-Up Table with Exponentially Varying Step-Size;" and U.S. patent application Ser. No. 12/324,934, entitled "Digital Signal Processor with One or More Non-Linear Functions Using Factorized Polynomial Interpolation;" each filed contemporaneously herewith and incorporated by reference herein.

FIELD OF THE INVENTION

The present invention is related to digital signal processing techniques and, more particularly, to techniques for digital processing of non-linear complex functions.

BACKGROUND OF THE INVENTION

Digital signal processors (DSPs) are special-purpose processors utilized for digital processing. Signals are often converted from analog form to digital form, manipulated digitally, and then converted back to analog form for further processing. Digital signal processing algorithms typically require a large number of mathematical operations to be performed quickly and efficiently on a set of data.

DSPs thus often incorporate specialized hardware to perform software operations that are often required for math-intensive processing applications, such as addition, multiplication, multiply-accumulate (MAC), and shift-accumulate. A Multiply-Accumulate architecture, for example, recognizes that many common data processing operations involve multiplying two numbers together, adding the resulting value to another value and then accumulating the result. Such basic operations can be efficiently carried out utilizing specialized high-speed multipliers and accumulators.

DSPs, however, generally do not provide specialized instructions to support complex mathematical functions, such as exp, log, cos, 1/x and $x^K$. Increasingly, however, there is a need for complex arithmetic operations in processors. A non-linear function is any problem where the variable(s) to be solved for cannot be written as a linear sum of independent components. A complex number can be written in the form a+bi, where a and b are real numbers, referred to as the real part and the imaginary part of the complex number, respectively. Many applications require complex arithmetic operations, such as complex addition or complex multiplications.

If supported at all, a DSP supports a non-linear function by using a large table look-up (LUT). An exemplary LUT may store on the order of 2,000 16 bit values, and thus require 32 kilobits of random access memory (RAM). The LUT is typically implemented in a separate dedicated SRAM (so that data and the non-linear LUT can be accessed at the same time to achieve improved performance).

In cases where the DSP is based on VLIW (Very Long Instruction Word) or SIMD (Single Instruction Multiple Data) architectures with N issues slots, the memory size becomes even larger. The LUT must be replicated N times because each issue slot must be able to read different values in the look-up table simultaneously, as the values of the data in each issue slot may be different. This replication of memory results in an even greater silicon area. For example, assuming a LUT in a 4-way vector co-processor, a memory size of 128 Kb is required (32 Kb×4). In addition, if different non-linear functions are required for different parts of a program being executed, the various LUTs must be loaded into memory, thereby significantly increasing latency and potentially reducing performance.

A need therefore exists for a digital signal processor having an instruction set that supports one or more non-linear complex math functions.

SUMMARY OF THE INVENTION

Generally, methods and apparatus are provided for a digital signal processor having an instruction set with one or more non-linear complex functions. According to one aspect of the invention, a method is provided for a processor. One or more non-linear complex software instructions are obtained from a program. The non-linear complex software instructions have at least one complex number as an input. One or more non-linear complex functions are applied from a predefined instruction set to the at least one complex number. An output is generated comprised of one complex number or two real numbers.

A functional unit can implement the one or more non-linear complex functions. In one embodiment, a vector-based digital signal processor is disclosed that processes a complex vector comprised of a plurality of complex numbers. The processor can process the plurality of complex numbers in parallel.

A more complete understanding of the present invention, as well as further features and advantages of the present invention, will be obtained by reference to the following detailed description and drawings.

DETAILED DESCRIPTION

The present invention provides a digital signal processor having an instruction set that supports one or more non-linear complex math functions. For example, the non-linear complex math functions can compute modulation/demodulation of a vector of I/Q data in one clock cycle, or compute modulus and angle parameters of components in a vector (without the need for square root, 1/x and arctangent functions). As used herein, the term "digital signal processor" shall be a processor that executes instructions in program code. Further, a hard-wired logic implementation of digital signal processing functions is not considered herein.

Figure 1:
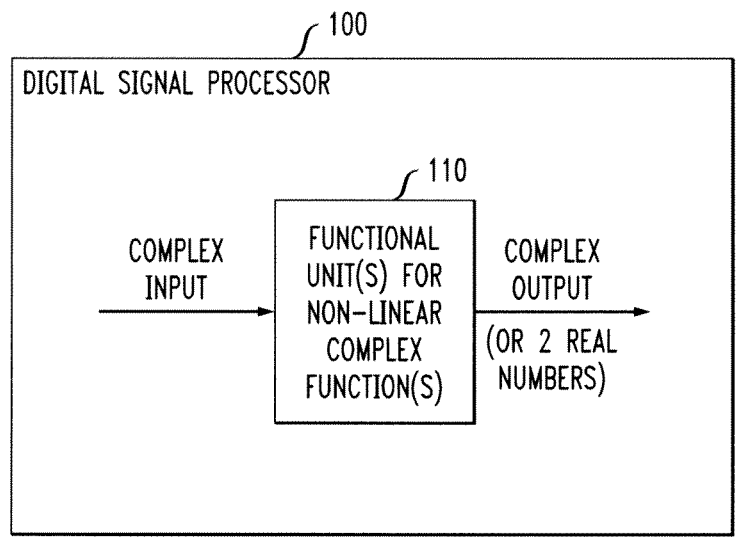
FIG. 1 is a schematic block diagram of an exemplary digital signal processor that incorporates features of the present invention.

FIG. 1 is a schematic block diagram of an exemplary digital signal processor 100 that incorporates features of the present invention. As shown in FIG. 1, the exemplary digital signal processor 100 includes one or more functional units 110 for non-linear complex functions. The non-linear complex functional units 110 process a complex input value and generate either a complex output value or two real numbers (such as a function returning abs(x) and angle(x)).

In various embodiments, the digital signal processor 100 may use hardware or a look-up table (or a combination thereof) to compute the non-linear values of the complex data. Generally, if the digital signal processor 100 is processing software code that includes a predefined instruction keyword corresponding to a non-linear complex math function and any appropriate operands for the function, the instruction decoder must trigger the appropriate non-linear complex functional units 110 that are required to process the instruction (e.g., connect two registers, apply one or more nonlinear complex mathematical operations on the values contained therein, and store the result in a third register). It is noted that a non-linear complex functional unit 110 can be shared by more than one instruction.

Generally, the present invention extends conventional digital signal processors to provide an enhanced instruction set that supports one or more non-linear complex functions. As shown in FIG. 1, a digital signal processor 100 in accordance with the present invention receives at least one complex number as an input, applies one or more non-linear complex functions to the input and generates either a complex number or two real numbers as the output value. In the exemplary notation of FIG. 1, the complex input $(r_n, i_n)$ comprises a real part, $r_n$, and an imaginary part, $i_n$, of the complex number, respectively.

The disclosed digital signal processors may have a scalar architecture, as shown in FIG. 1, that processes a single complex number at a time, or a vector architecture, as discussed hereinafter in conjunction with FIG. 2, that processes one or more complex numbers simultaneously. In the case of a vector-based digital signal processor implementation, the input complex number is a vector comprised of a plurality of complex numbers that are processed in parallel.

Figure 2:
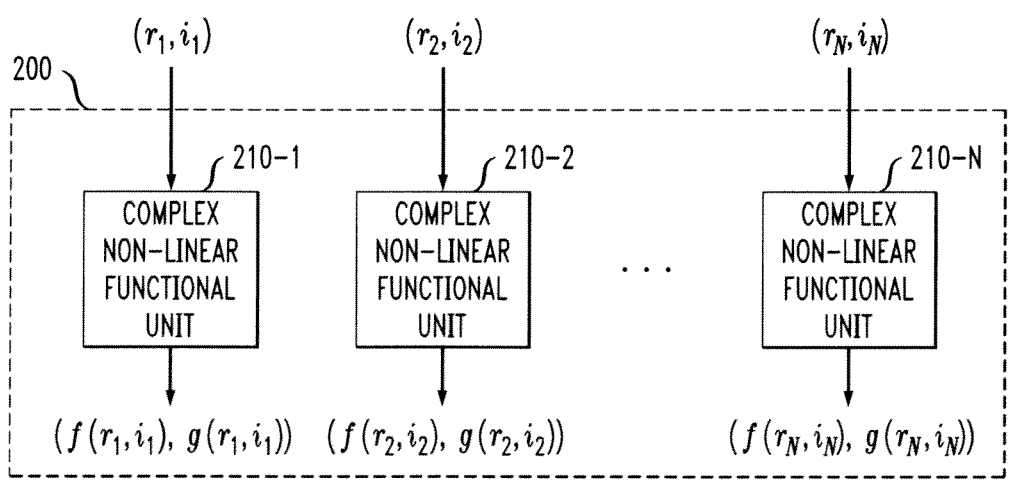
FIG. 2 is a schematic block diagram of an exemplary vector-based digital signal processor that processes one or more complex numbers simultaneously in accordance with an embodiment of the present invention.

FIG. 2 is a schematic block diagram of an exemplary vector-based digital signal processor 200 that processes one or more complex numbers simultaneously in accordance with an embodiment of the present invention. Generally, the vector-based implementation of FIG. 2 increases the number of MIPs (instructions per second), relative to the scalar implementation of FIG. 1, by performing different processes concurrently. Thus, the vector-based digital signal processor 200 contains plural non-linear complex functional units 210-1 through 210-N. For example, a dual digital signal processor 200 contains two non-linear complex functional units 210-1 and 210-1 that are capable of performing two independent non-linear complex function operations concurrently.

As noted above, the input to the vector-based digital signal processor 200 is a complex vector comprised of a plurality of complex numbers $(r_n, i_n)$ that are processed in parallel. Each complex number $(r_n, i_n)$ in the vector comprises a real part, $r_n$, and an imaginary part, $i_n$, of the complex number.

For example, assume a vector-based digital signal processor 200 supports a non-linear complex function for a modulator that rotates a complex vector, X, by a given angle, α, where X is complex vector comprised of complex numbers $x_1$ through $x_4$. The exemplary function may be expressed as follows:

$$\text{Cpx\_mod\_vec4}(x_1, x_2, x_3, x_4, \alpha) \rightarrow \text{returns complex vector}$$

In another example, assume a vector-based digital signal processor 200 supports a non-linear complex function that computes a modulus and angle of a complex vector input, X, where X is complex vector comprised of complex numbers $x_1$ through $x_4$. The exemplary function may be expressed as follows:

$$\text{Cpx\_polar\_vec4}(x_1, x_2, x_3, x_4) \rightarrow \text{returns (abs(x), angle(x)) for each complex number component.}$$

Conclusion

While exemplary embodiments of the present invention have been described with respect to digital logic blocks and memory tables within a digital signal processor, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit or micro-controller. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, wherein, when the program code is loaded into and executed by a machine, such as a processor, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method performed by a vector-based processor, comprising:

obtaining one or more non-linear complex software instructions having at least one complex input vector, wherein said one or more non-linear complex software instructions implement one or more corresponding non-linear complex functions and wherein said at least one complex input vector comprises one or more of real and complex components; and in response to a predefined software instruction keyword for at least one of said one or more non-linear complex software instructions, performing the following steps for each component of said at least one complex input vector, wherein said at least one complex input vector comprises a plurality of complex numbers and wherein said vector-based processor processes said plurality of complex numbers substantially simultaneously, wherein said predefined software instruction keyword for said at least one non-linear complex software instruction is part of an instruction set of said vector-based processor:

invoking at least one hardware non-linear functional unit that implements said one or more non-linear complex software instructions to apply one of the one or more corresponding non-linear complex functions to each component of said at least one complex input vector to generate a corresponding complex-valued component of an output vector.

2. The method of claim 1, wherein said vector-based processor executes said one or more non-linear complex software instructions from program code.

3. The method of claim 1, wherein said vector-based processor employs one or more of hardware and a look-up table to compute the complex-valued components of said output vector.

4. The method of claim 1, wherein said at least one complex input vector comprises Inphase/Quadrature (I/Q) data and wherein said one or more corresponding non-linear complex functions compute one or more of a modulation of said I/Q data and a demodulation of said I/Q data.

5. The method of claim 1, wherein said one or more corresponding non-linear complex functions comprise a non-linear complex modulation function that rotates said at least one complex input vector by a given angle, $\alpha$.

6. The method of claim 1, wherein said one or more corresponding non-linear complex functions comprise a non-linear complex function that computes one or more of a modulus and an angle of said at least one complex input vector.

7. A vector-based processor, comprising:
an input for receiving one or more non-linear complex software instructions that implement one or more corresponding non-linear complex functions, wherein said one or more non-linear complex software instructions have at least one complex input vector, wherein said at least one complex input vector comprises one or more of real and complex components, wherein said at least one complex input vector comprises a plurality of complex numbers and wherein said vector-based processor processes said plurality of complex numbers substantially simultaneously; and
at least one hardware functional unit for applying one of said one or more corresponding non-linear complex functions to each component of said at least one complex input vector to generate a corresponding complex-valued component of an output vector in response to a predefined software instruction keyword for at least one of said one or more non-linear complex software instructions, wherein said predefined software instruction keyword for said at least one non-linear complex software instruction is part of an instruction set of said vector-based processor.

8. The vector-based processor of claim 7, wherein said vector-based processor executes said one or more non-linear complex software instructions from program code.

9. The vector-based processor of claim 7, wherein said vector-based processor employs one or more of hardware and a look-up table to compute the complex-valued components of said output vector.

10. The vector-based processor of claim 7, wherein said at least one complex input vector comprises Inphase/Quadrature (I/Q) data and wherein said one or more corresponding non-linear complex functions compute one or more of a modulation of said I/Q data and a demodulation of said I/Q data.

11. The vector-based processor of claim 7, wherein said one or more corresponding non-linear complex functions comprise a non-linear complex modulation function that rotates said at least one complex input vector by a given angle, $\alpha$.

12. The vector-based processor of claim 7, wherein said one or more corresponding non-linear complex functions comprise a non-linear complex function that computes one or more of a modulus and an angle of said at least one complex input vector.

13. An integrated circuit, comprising:
a vector-based processor, comprising:
an input for receiving one or more non-linear complex software instructions that implement one or more corresponding non-linear complex functions, wherein said one or more non-linear complex software instructions have at least one complex input vector, wherein said at least one complex input vector comprises one or more of real and complex components, wherein said at least one complex input vector comprises a plurality of complex numbers and wherein said vector-based processor processes said plurality of complex numbers substantially simultaneously; and
at least one hardware functional unit for applying one of said one or more corresponding non-linear complex functions to each component of said at least one complex input vector to generate a corresponding complex-valued component of an output vector in response to a predefined software instruction keyword for at least one of said one or more non-linear complex software instructions, wherein said predefined software instruction keyword for said at least one non-linear complex software instruction is part of an instruction set of said vector-based processor.

14. The integrated circuit of claim 13, wherein said vector-based processor executes said one or more non-linear complex software instructions from program code.

15. The integrated circuit of claim 13, wherein said vector-based processor employs one or more of hardware and a look-up table to compute the complex-valued components of said output vector.

16. The integrated circuit of claim 13, wherein said at least one complex input vector comprises Inphase/Quadrature (I/Q) data and wherein said one or more corresponding non-linear complex functions compute one or more of a modulation of said I/Q data and a demodulation of said I/Q data.

17. The integrated circuit of claim 13, wherein said one or more corresponding non-linear complex functions comprise a non-linear complex modulation function that rotates said at least one complex input vector by a given angle, $\alpha$.

18. The integrated circuit of claim 13, wherein said one or more corresponding non-linear complex functions comprise a non-linear complex function that computes one or more of a modulus and an angle of said at least one complex input vector.

* * * * *